Nov. 10, 1931.   J. P. ELLENBECKER   1,831,412
AUTOMATIC CONTROL FOR STONE CUTTING AND FINISHING MACHINES
Filed Nov. 14, 1929   3 Sheets-Sheet 1

Inventor
John P. Ellenbecker
By his Attorneys
Merchant and Kreger

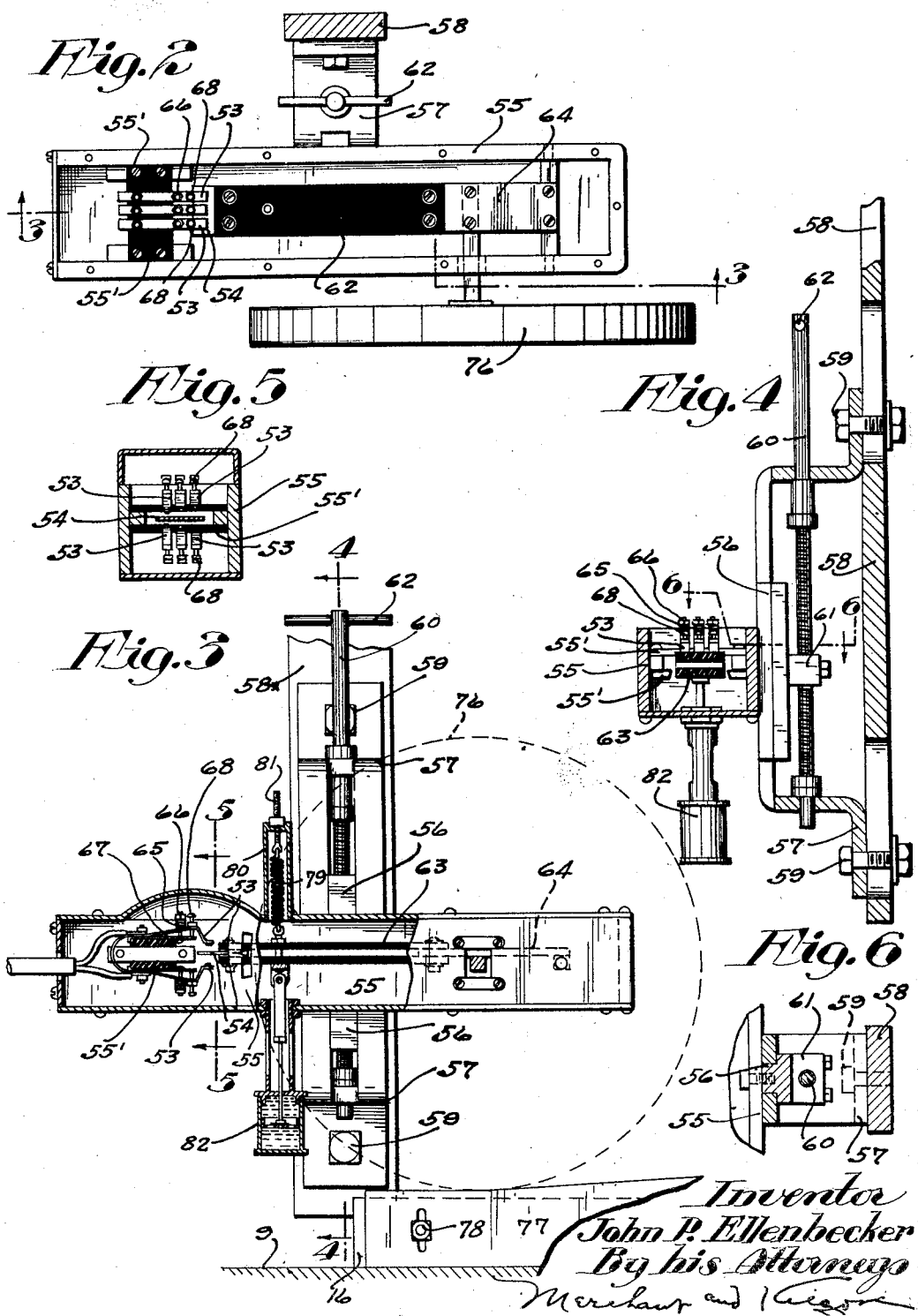

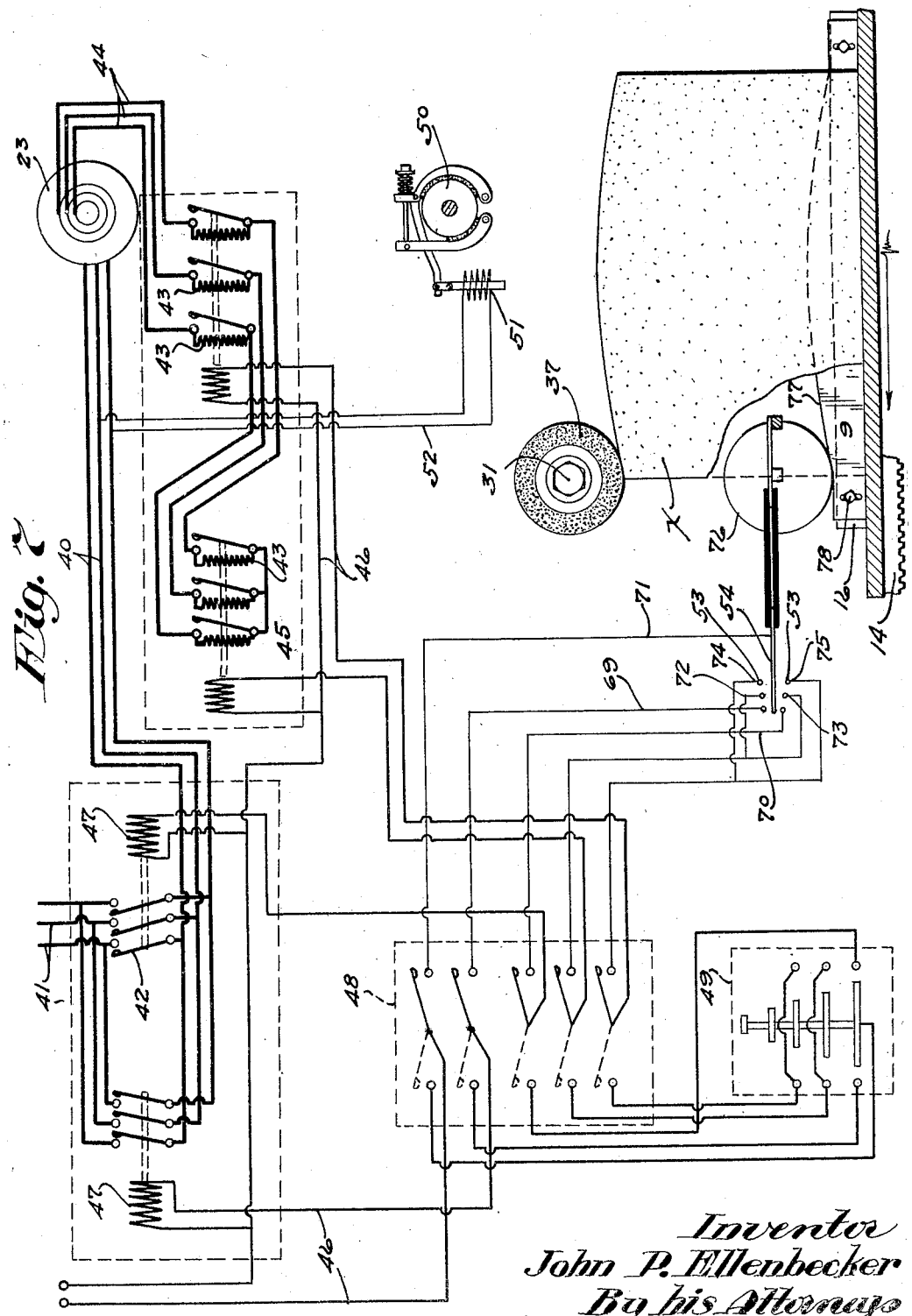

Patented Nov. 10, 1931

1,831,412

UNITED STATES PATENT OFFICE

JOHN P. ELLENBECKER, OF ST. CLOUD, MINNESOTA

AUTOMATIC CONTROL FOR STONE-CUTTING AND FINISHING MACHINES

Application filed November 14, 1929. Serial No. 407,111.

My present invention relates broadly to means for automatically grinding, cutting or otherwise forming and finishing serpentine surfaces on solid bodies, but was designed especially for cutting such surfaces on monumental and building stone and the like. These stones are quite generally cut by the use of a motor-driven cutting or finishing tool and the problem of cutting straight or flat surfaces parallel to the line of feed has been comparatively easy while cutting of surfaces not parallel thereto has been very difficult and is usually performed by hand. The difficulty noted was found in the fact that the cutting tool, motor and support therefore were very heavy making it difficult and expensive to operate to cut serpentine surfaces by the use of a direct-acting template. The use of a template heretofore necessitated the disconnecting of the motor and cutting tool support from its raising and lowering mechanism and the supporting thereof directly on the template. In view of the heavy load the template was required to carry, it was necessary to make the same very heavy and strong and the expense thereof was such that a template was only used when a relatively large number of duplicate parts were to be made, and even when provided, the use thereof encountered many difficulties. Furthermore, a great deal of power was required to move the template in respect to the cutting or finishing tool to raise the load supported on the platen.

The machine illustrated in which my present invention is embodied employs a raising and lowering device, that is a device for varying, setting and controlling the movement of a cutting or finishing tool toward and from the work carried on a movable platen and operated by a reversible variable speed electric motor. In connection with this electric motor I provide a novel differentially-acting controlling device whereby, the electric motor will be operated intermittently at variable speeds in either direction under the control of a very light and inexpensive template movable with the platen and operative to raise, lower or otherwise vary the position of the cutting or finishing tool in respect to the work according to the curved, straight or irregular line that it is desired to cut and which is represented by the template. This differential motor-controlling device illustrated in the drawings and hereinafter described, involves a plurality of spaced contacts connected to one side of the motor circuit and a cooperating movable contact connected to the other side of the motor circuit the movement of which is actuated by the template to control the forming of the curve or irregular surface. To provide for the cutting of surfaces that rise and fall, the spaced contacts of the motor circuit are arranged in two lines or series and are cooperatively arranged in respect to the movable contact for the cutting of such surfaces under the control of a properly designed template.

The invention further provides other important and novel features, as will hereinafter appear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a plan view of the differential motor controlling device, on an enlarged scale;

Fig. 3 is a view partly in side elevation and partly in section taken on the irregular line 3—3 of Fig. 2 with the tracer wheel indicated by broken lines and further fragmentarily illustrating a platen by means of broken lines and the template in side elevation;

Fig. 4 is a view partly in elevation and partly in section taken on the line 4—4 of Fig. 3;

Fig. 5 is a view partly in elevation and partly in section taken on the line 5—5 of Fig. 3;

Fig. 6 is a detail view principally in section taken on the irregular line 6—6 of Fig. 4; and Fig. 7 is a wiring diagram.

Figure 1:
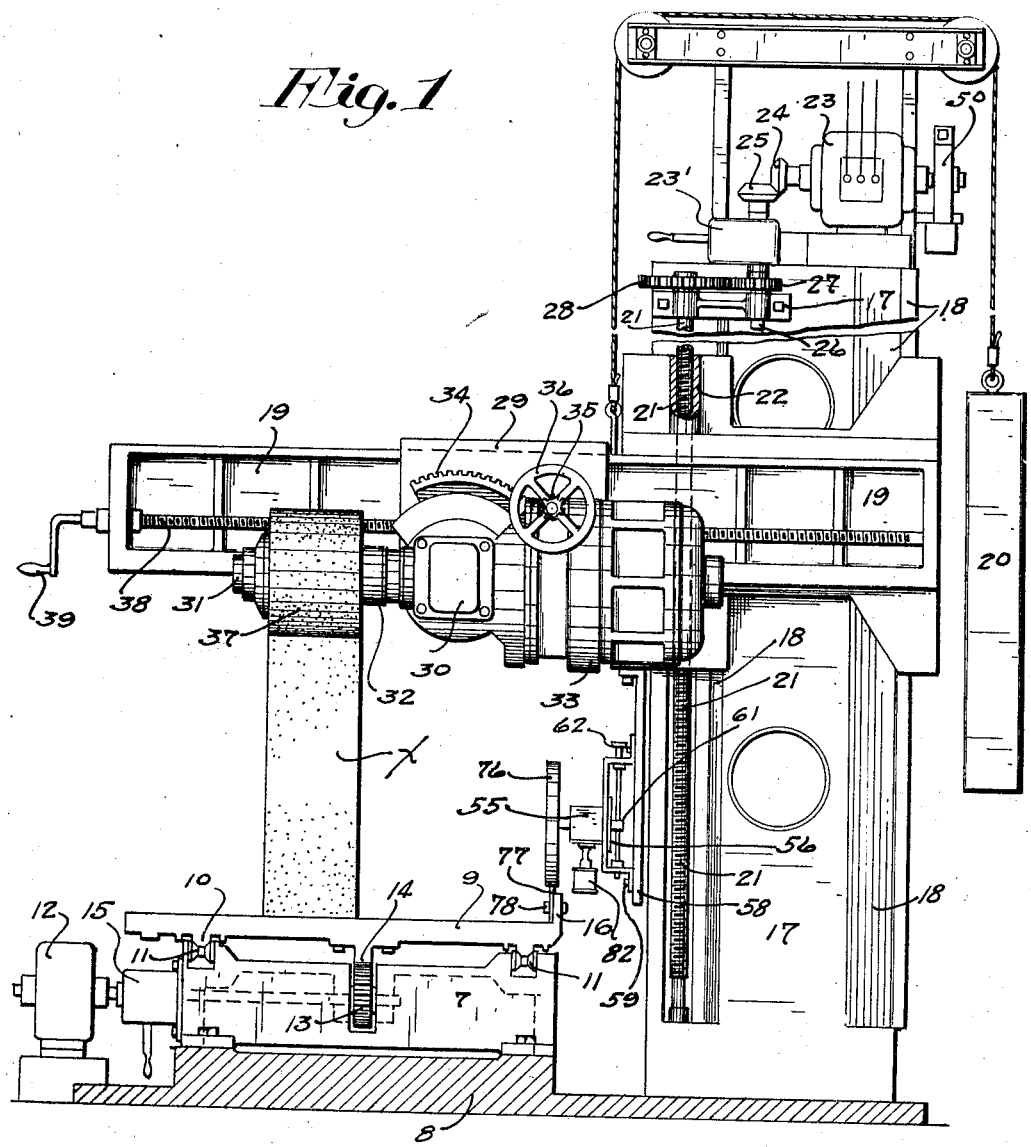
Fig. 1 is a front elevation of a stone cutting machine having the invention embodied therein.

The numeral 7 indicates a base supported on and rigidly secured to a bed 8 and on which base a reciprocating platen or work table 9 is mounted. This work table 9 has on its under side a pair of rails 10 which rest in spool-like rollers 11 journaled on the base 7. To reciprocate the work table 9 there is provided an electric motor 12 which drives a gear 13 journaled on the base 7 and meshing with a rack 14 on the under side of said table. In the driving connections from the motor 12 to the gear 13 is a variable speed transmission mechanism diagrammatically illustrated and indicated, as an entirety, by the numeral 15. The direction of travel of the work table 9 may be reversed either by the motor 12 or the transmission mechanism 15. On the right hand side of the work table 9 is an upstanding longitudinally extended flange 16 for a purpose that will presently appear.

Mounted on the bed 8 at the right side of the base 7 is a heavy fixed upright post 17 having vertical ways 18 on which a horizontal cross rail 19 is mounted for parallel raising and lowering movements over said base. This cross rail 19 is held substantially counter-balanced by a weight 20 and is raised and lowered by a long vertical feed screw 21 journaled at its ends in bearings on the post 17 and works in a nut-acting member 22 secured to the cross rail 19 and held against rotation. An electric motor 23 is provided for operating the feed screw 21 and has on its armature shaft a miter pinion 24 which meshes with a miter gear 25 on the upper end of a short shaft 26 journaled in a bearing on the post 17. A spur pinion 27 on the shaft 26 meshes with a spur gear 28 on the upper end of the feed screw 21.

A variable speed transmission mechanism diagramamtically illustrated by the numeral 23¹ is interposed between the gear 25 and pinion 27 for varying the speed of the raising or lowering of the cross rail 19 in respect to the travel of the work table 9. The transmission mechanism 15 permits the speed of the work table 9 to be varied in respect to the speed at which the cross rail 19 may be raised or lowered.

A saddle 29 is mounted on the cross rail 19 for horizontal sliding movement and attached thereto is a swivel 30 the axis of which is horizontal and extends parallel to the line of travel of the work table 9. Journaled in the swivel 30 is a spindle 31 to which is secured a tool head 32. The spindle 31 is driven by an electric motor 33 carried by the swivel 30. Said swivel 30 is turned about its axis by means of a segmental rack 34 on the saddle 29 and a cooperating pinion 35 which may be operated, at will, by a hand wheel 36. Secured to the tool head 32 is a grinding wheel 37. The saddle 29 is moved back and forth on the cross rail 19 by a cross feed screw 38 journaled in bearings on said cross rail and works in a nut-acting member, not shown, on said saddle. A hand-crank 39 is provided for operating the cross feed screw 38.

By turning the feed screw 21 the cross rail 19 may be raised or lowered, and hence, the grinding wheel 37, and by operating the cross feed screw 38 the saddle 29 may be moved back and forth on the cross rail 19 to axially adjust said grinding wheel transversely of the feed table 9. The swivel 30 may be turned about its axis by manipulating the hand wheel 36 to move the grinding wheel 37 in the arc of a circle between vertical and horizontal positions.

The electric motor 23 may be of any reversible variable speed type for either direct or alternating currents of standard voltage and frequency. There is illustrated in the drawings a three phase alternating current motor of the slip ring type. The lead wires 40 of said motor are connected to power supply wires 41 by a magnetic reversing switch 42 and the speed of said motor is controlled by a series of resistances 43, as shown two, in an induced secondary three phase circuit 44 that leads from the motor 23. Two relays 45 is a circuit 46 of a lower voltage than the power circuit 41 are provided for shunting the current around one or both resistances 43 to increase the speed of the motor 23. Two electro magnets 47 in the circuit 46 are provided for operating the reversing switch 42 and interposed in said circuit is a hand operated double-throw multiple switch 48 for manually controlling the reversing switch 42 and when said double-throw switch is in neutral position the reversing switch 42 is open. Also interposed in the circuit 46 is a hand controller 49 for closing the circuit 46 to energize either one of the magnets 47 for reversing the motor 23 and to energize either one or both of the relays 45 for shunting the circuit around either one or both resistances 43 to vary the sped of the motor 23.

An automatic magnetic brake 50 is provided for the motor 23 and the circuit of its magnet 51 is indicated by the numeral 52 and leads from the motor fed circuit 40. As is well known, this type of brake 50 will automatically release when the motor circuit 40 is closed by the reversing switch 42 and will set when said circuit is open, thus preventing the motor 23 from being operated by momentum.

Referring now in detail to the automatic differentially-acting controlling device, the numeral 53 indicates a plurality of spaced relatively fixed contacts and the numeral 54 indicates a cooperating movable contact. Said fixed contacts 53 are arranged in two series cooperatively arranged one on each side of neutral position of the movable contact 54. These contacts 53 and 54 are mounted in a box-like casing 55 having a displaceable cover and the body of said casing is rigidly secured to a crosshead 56 mounted in ways on a relatively fixed support 57. This support 57 is mounted on a heavy depending bar 58 secured to the under side of the cross rail 19 between the flange 16 and post 17 and holds the casing 55 above said flange. The support 57 is secured to the bar 58 for vertical adjustment by nut-equipped bolts 59 which extend through holes in the upper and lower ends of said support and vertical slots in said bar.

To vertically adjust the casing 55 on its support 57 there is provided a micrometer screw rod 60 journaled in bearings on the support 57 and works in a nut-acting member 61 rigidly secured to the cross-head 56 and having in its upper end a turning pin 62 by which said micrometer screw rod 60 may be operated.

The upper and lower series of contacts 53 are secured to a pair of vertically spaced members 55' which extend transversely through the casing 55 and secured to the sides thereof.

The two series of fixed contacts 53 are spaced the one above the other with the movable contact 54 extending horizontally therebetween. This movable contact 54, as shown, is in the form of a flat finger, rigidly secured to and between a pair of spaced insulating members 63, which, in turn, are rigidly secured to the outer end of a horizontal arm 64 pivoted to the casing 55 for vertical movement to carry the movable contact 54 into engagement with the contact 53 of either series.

It is important to note, by reference to Figs. 3, 5 and 7, that the movable contact 54 when in neutral position is midway between the two series of contacts 53 and out of contact therewith. It is also important to note that the contacts 53 of each series are successively and progressively farther away from neutral position of the movable contact 54, reading from the left to the right in respect to Figs. 5 and 7. Each contact 53 is yieldingly pressed toward the movable contact 54 by a coiled spring 65 on a nut-equipped bolt 66 secured to a fixed stop plate 67 on one of the insulating members 55' and under the respective contact 53. The approaching movement of each contact 53 toward the contact 54 is limited by an adjustable screw 68 secured to said contact 53 and normally impinging against the stop plate 67.

The two left-hand contacts 53 are provided for closing the circuits for the reversing switch 42 and connected, the upper one by a wire 69 to the switch 48 and the lower one by a wire 70 to said switch 48 and the movable contact 54 is connected by a wire 71 to the switch 48. When the movable contact 54 is in engagement with the upper left-hand contact 53 the circuit 46 is closed energizing the left-hand magnet 47 which operates the switch 42 to reverse the motor 23 for movement in a direction to elevate the grinding wheel 37. A reverse or downward movement of the movable contact 54 will engage the lower left-hand contact 53, close the circuit 46, energizing the right-hand magnet 47 which operates the switch 42 to reverse the motor 23 for rotation in the proper direction to lower the grinding wheel 37.

The two intermediate contacts 53 are connected to the switch 48, the upper one by a wire 72 and the lower one by a wire 73 and when the movable contact 54 is in engagement with either one of said intermediate contacts, the left-hand relay 43 will be energized and operated to shunt the circuit around the left-hand resistance 43 and thereby cause the motor to operate at intermediate speed. Wires 74 and 75 connect the upper and lower right-hand contacts 53, respectively, to the switch 48. When the movable contact 54 is in engagement with either one of these right-hand contacts 53 the circuit 46 is closed and the right-hand relay 45 energized and operated to the circuit around the right-hand resistance 43 and thereby cause the motor 23 to operate at high speed.

It will be understood that when the movable contact 54 is in engagement with either one of the left-hand contacts 53 the motor 23 is operating at low speed and when said movable contact is moved into engagement with either one of the intermediate contacts 53 the engaged left-hand contact will yield to permit such movement and likewise the engaged intermediate contact 53 will yield to permit the movable contact 54 to engage one of the right-hand contacts 53.

The movable contact 54 is automatically operated by a tracer wheel 76 and a cooperating template 77 on which said wheel is arranged to run. This wheel 76 is journaled on a trunnion which extends transversely of the arm 64 and is rigidly secured thereto, see Figs. 2 and 3. Said template 77 is cut from a thin sheet of metal or other suitable material and is detachably but rigidly secured to the flange 16 by nut-equipped bolts 78 which extend through holes in said flange and vertical slots in said template.

A counterbalancing spring 79 is provided for holding the tracer wheel 76 substantially balanced to take the majority of its weight from the template, but has sufficient weight on said template to keep the wheel 76 in contact therewith so that the wheel 76 will closely follow the template 77. This counter-balancing spring 79 is held in an upright tubular housing 80 on the casing 55, attached to the insulating members 63 and anchored to an adjusting screw 81 in the top of said housing. By adjusting the nut on the screw 81 the tension of the spring 79 may be varied, at will. To steady the action of the movable contact 54 and prevent undue vibrations there is provided a dash pot 83 held suspended from the casing 55 and its piston rod is attached to the insulating members 63.

Mounted on the feed table 9 is a stone X the top of which is to be cut by the grinding wheel 37 to the shape of the template 77. The weight of this stone X is sufficient to hold the same in position on the work table 9.

It is now the general practice to cut a template in the drafting or designing room to be used by a stone cutter in shaping a serpentine or other irregular surface. By the use of my automatic controlling device the template is simply attached to the feed table 9 and the grinding wheel 37 automatically controlled thereby.

*Operation*

It may be assumed that a stone to be cut is on the work table 9, aligned both longitudinally and transversely in respect to the grinding wheel 37, that a template is secured to said work table, that the grinding wheel 37 is raised and that the top of the stone is to be cut to the shape of the template. The template 77, as shown, has straight end portions and a raised intermediate portion that is on the arc of a circle.

The work table 9 is first moved to position one end of the stone under the grinding wheel 37 and the manually operated switch 48 set to cut out the automatic controlling device and connect the hand controller 49 in the circuit 46. This hand controller 49 is then operated to lower the grinding wheel 37 substantially into contact with the top of the stone and thereafter the hand switch 48 is operated to cut out the hand controller 49 and connect the automatic controlling devices in the circuit 46 and the switch 48. The final manual adjustment of the grinding wheel 37 for the first cut to be made on the stone is performed by means of the micrometer screw rod 60 which positions the automatic controlling device with its tracer wheel 76 resting on the straight end portion of the template 77 which corresponds to the same end of the stone over which the grinding wheel 37 is positioned. In this position of the tracer wheel 76 the movable contact 54 is in neutral position and the brake 50, for the motor 23, set. To adjust the automatic controlling device onto stones that vary considerably in height the support 57 may be raised or lowered on the bar 58.

The motor 12 for driving the work table 9 is next started to move the stone under the grinding wheel 37. Primarily, the top of the stone is square and the first cuts made by the grinding wheel 37 will only take off the corner portions of the stone and thereafter as the tracer wheel 76 comes into contact with the curved portion of the template 37 the movable contact 54 is lifted into engagement with the upper left-hand contact 53 which completes the circuit 46 through the wires 69, 71 and switch 48, energizes the left-hand magnet 47 which operates the reversing switch 42 to cause the motor 23 to rotate in the proper direction to elevate the grinding wheel 37 by means of the feed screw 21. At the time the circuit for the motor 23 is closed the brake 50 is automatically released and said motor is operating at low speed.

Further lifting movement of the tracer wheel 76 by the curved portion of the template 77 will lift the movable contact 54 into engagement with the upper intermediate contact 53 which completes the circuit 46 through the wires 71, 72, switch 48 to the left-hand relay 45 to operate the same and shunt the circuit through the wires 44 around the left-hand resistance 43 and thereby cause the motor 23 to operate at intermediate speed.

The movable contact 54, when lifted still higher by the template 77, will engage the upper right-hand contact 53 and thereby through the wire 74 close the circuit 46 through the right-hand relay 45 which shunts the circuit 44 around the right-hand resistance 43 and causes the motor to operate at higher speed. During the lifting of the movable contact 54, the upper series of yielding contacts 53 are successively and progressively picked up by said movable contact and held thereby.

At the time the tracer wheel 76 moves over the crown of the template 77, the movable contact 54 will return to neutral position and at which time the upper series of contacts 53 will be progressively and successively released by the movable contact 54 in reverse order from that in which they were picked up thereby and cause the motor to drop from high speed to intermediate speed and from intermediate speed to low speed and as the movable contact 54 moves out of engagement with the upper left-hand contacts 53, the circuit of said motor is broken and the brake 50 automatically set to prevent the motor 23 from operating by momentum.

As the tracer wheel 76 moves downward on the curved portion of the template 77 the lower series of contacts 53 are engaged by the movable contact 54 in the same manner that the upper series of contacts 53 were engaged thereby and the action of reversing the motor and shunting the circuit 44 around the resistance 43 is also the same as that previously described except that the screw 21 is rotated in a reverse direction to lower the grinding wheel 37.

From the curved portion of the template 77 the tracer wheel 76 moves onto the rear straight end portion of said template and thereby causes the movable contact 54 to progressively release the lower series of contacts 53 in reverse order from that in which they were picked up and progressively decrease the speed of the motor 27 and finally open the circuit of said motor and set the brake 50 to prevent said motor from operating by momentum.

To make a second cut over the top of the stone, the automatic controlling device is manually lowered, say one-sixteenth of an inch by the micrometer screw rod 60, and the direction of travel of the work table 9 reversed so that the stone will be cut in an opposite direction from that in which the first cut was made but in the same manner. This adjustment of the automatic controlling device may be repeated until the stone is cut to the proper shape.

Any desired number of contacts 53, which correspond with the intermediate and right-hand contacts 53, may be used so that there will be considerable variation in the speed of the motor 23. For each pair of contacts 53 added, it will be necessary to add another resistance and correspondingly modify the switch 48 and hand controller 49. Various different kinds of cutting, grinding and finishing tools may be employed during the cutting of a stone and while the invention is shown embodied in a stone cutting machine, the same is equally well adapted for use where similar cutting action takes place. In the preferred arrangement of the apparatus illustrated, the maximum raising and lowering of the grinding wheel 37 is substantially that of the travel of the work table 9.

In some instances it might be desirable to provide a template in which it is necessary for the tracer wheel 76 to travel under the same rather than over the template as shown. In such a modification the spring 79 may be adjusted to cause the tracer wheel 76 to be lifted into contact with such a template.

The position of the tracer wheel 76 on the arm 64 is such that very slight vertical movement imparted to said wheel by the template 77 will materially increase the movement of the contact 54 so that slight changes in the angle of said template will cause the movable contact 54 to pick up or release the contacts 53 to vary the speed of the motor 23, and hence, the speed at which the grinding wheel 37 is moved vertically toward or from the work without stopping the motor 23, thus causing the grinding wheel 37 to cut true curves or inclined surfaces.

In place of feeding the stone horizontally to a cutting tool, the mechanism may be modified to feed said cutting tool horizontally to the work or the stone may be moved vertically into or out of engagement with the cutting tool.

What I claim is:

1. The combination with two cooperating members one of which is a work support and the other of which is a tool, one of said members being mounted for raising and lowering movements and a mechanism for raising and lowering the same including a reversible variable speed motor, one of said members being mounted for horizontal movement, of an automatic differentially-acting controlling device for intermittently operating the motor in either direction at variable speeds and a template, one of which is on the member mounted for horizontal movement and the other of which is relatively stationary, said controlling device having an actuating tracer controlled by the template.

2. The combination with a vertically movable tool, mechanism for raising and lowering the tool including a reversible variable speed motor, a traveling work table, and means for operating the table for feeding the work thereon to the tool, of a template on the work table, and an automatic differentially-acting controlling device for intermittently operating the motor in either direction at variable speeds and having an actuating tracer controlled by the template.

3. The structure defined in claim 2 in which the controlling device is adjustable in respect to the template to vary the position of the tool in respect to the work.

4. The combination with a vertically movable tool, mechanism for raising and lowering the tool including a reversible motor, a reversing switch and resistance in the motor circuit, a traveling work table, and means for operating the table for feeding work thereon to the tool, of a template on the work table, a magnetically operated differentially-acting controlling device for operating the switch and for progressively varying the resistance to change the speed of the motor and including a plurality of spaced contacts and a cooperating movable contact, said spaced contacts being arranged in two series cooperatively arranged one on each side of neutral position of the movable contact, and an actuating tracer for the movable contact controlled by the template.

5. The structure defined in claim 4 in which the spaced contacts are yieldingly pressed toward the movable contact, and in which the spaced contacts in each series are successively and progressively normally spaced farther away from neutral position of the movable contact.

6. The combination with two cooperating members one of which is a work support and the other of which is a tool, one of said members being mounted for raising and lowering movements and mechanism for raising and lowering the same including a variable speed electric motor, the other of said members being mounted for horizontal movement, of an automatic differentially-acting controlling device for operating the motor at variable speeds and a cooperating template, one of which is on the member mounted for horizontal movement and the other of which is relatively stationary, said controlling device includes a plurality of spaced contacts and a cooperating movable contact, said controlling device having an actuating tracer controlled by the template, said movable contact being arranged to engage or release the spaced contacts progressively and differentially according to the vertical pitch of the template.

7. The combination with two cooperating members one of which is a work support and the other of which is a tool, one of said members being mounted for raising and lowering movements and mechanism for raising and lowering the same including a reversible variable speed electric motor, the other of said members being mounted for horizontal movement, of an automatic differentially-acting controlling device for operating the motor in either direction and at variable speeds and a cooperating template, one of which is on the member mounted for horizontal movement and the other of which is relatively stationary, said controlling device includes a plurality of spaced contacts and a cooperating movable contact, said spaced contacts being arranged in two series cooperatively arranged one on each side of neutral position of the movable contact, said controlling device having an actuating tracer controlled by the template, said movable contact being arranged to engage or release the spaced contacts of each series progressively and differentially according to the vertical pitch of the template.

8. The combination with two cooperating members, one of which is a work support and the other of which is a tool, one of said members being mounted for raising and lowering movements, and power means for raising and lowering the same at variable speeds, one of said members being mounted for horizontal movement, of an automatic differentially-acting controlling device for intermittently operating the power means in either direction at variable speeds and a template, one of which is on the member mounted for horizontal movement and the other of which is relatively stationary, said controlling device having an actuating tracer controlled by the template.

In testimony whereof I affix my signature.

JOHN P. ELLENBECKER.